(12) United States Patent
Walentowski

(10) Patent No.: US 12,403,956 B2
(45) Date of Patent: Sep. 2, 2025

(54) STEER-BY-WIRE STEERING SYSTEM

(71) Applicant: ZF Automotive Germany GmbH, Alfdorf (DE)

(72) Inventor: Stephan Walentowski, Düsseldorf (DE)

(73) Assignee: ZF Automotive Germany GmbH, Alfdorf (DE)

( * ) Notice: Subject to any disclaimer, the term of this patent is extended or adjusted under 35 U.S.C. 154(b) by 172 days.

(21) Appl. No.: 18/323,695

(22) Filed: May 25, 2023

(65) Prior Publication Data

US 2023/0382453 A1 Nov. 30, 2023

(51) Int. Cl.
*B62D 15/02* (2006.01)
*B62D 5/04* (2006.01)

(52) U.S. Cl.
CPC ....... *B62D 15/0235* (2013.01); *B62D 5/0463* (2013.01)

(58) Field of Classification Search
CPC ..... B62D 5/001; B62D 5/0235; B62D 5/0481
See application file for complete search history.

(56) References Cited

U.S. PATENT DOCUMENTS

| | | | | |
|---|---|---|---|---|
| 6,803,736 B1* | 10/2004 | Hommel | ................ | G05B 9/02 |
| | | | | 318/806 |
| 2011/0118937 A1* | 5/2011 | Kariatsumari | ....... | B62D 5/0496 |
| | | | | 701/41 |
| 2020/0180685 A1* | 6/2020 | Suzuki | ................ | B62D 5/0412 |
| 2020/0307686 A1* | 10/2020 | Namikawa | ........... | B62D 5/0481 |
| 2020/0309566 A1* | 10/2020 | Fujita | .................... | G01L 5/0042 |
| 2021/0179166 A1* | 6/2021 | Bergmann | ............. | B62D 5/003 |
| 2022/0063710 A1* | 3/2022 | Tsubaki | ............... | B62D 5/0409 |
| 2022/0081023 A1* | 3/2022 | Miyake | ................ | B62D 5/0463 |
| 2022/0297747 A1* | 9/2022 | Polmans | ............. | B62D 5/0421 |

FOREIGN PATENT DOCUMENTS

| | | |
|---|---|---|
| DE | 10042308 A1 | 11/2001 |
| DE | 102017217581 A1 | 4/2019 |
| DE | 102019203111 A1 | 9/2020 |
| DE | 102019007715 A1 | 5/2021 |

* cited by examiner

*Primary Examiner* — Long T Tran
(74) *Attorney, Agent, or Firm* — Kristin L. Murphy

(57) ABSTRACT

A steer-by-wire steering system for a vehicle is disclosed, having a steering wheel, at least one sensor for capturing a steering angle of the steering wheel, a processing logic unit for determining a wheel setting angle requirement on the basis of the captured steering angle, and an actuator unit for setting a wheel setting angle at wheels of the vehicle according to the wheel setting angle requirement determined by the processing logic unit. The sensor is electrically connected directly to the vehicle electrical system and is supplied with electrical energy via the latter.

9 Claims, 3 Drawing Sheets

STEER-BY-WIRE STEERING SYSTEM

CROSS-REFERENCE TO RELATED APPLICATION

This application claims priority to German Priority Application No. 102022205354.0, filed May 30, 2022, the disclosure of which is incorporated herein by reference in its entirety.

TECHNICAL FIELD

The disclosure relates to a steer-by-wire steering system for a vehicle.

BACKGROUND

Steering systems usually comprise a toothed rack which is mounted in a linearly displaceable manner in order to adapt a wheel position. Originally, such a toothed rack is coupled to the steering wheel via a steering rod, with the result that the toothed rack is linearly displaced by rotating the steering wheel.

Motor vehicles having so-called steer-by-wire steering systems (SbW steering system), in which there is no longer a mechanical connection between the steering wheel and the toothed rack, will be increasingly used in future. The position of the steering wheel is captured electronically and the toothed rack is displaced accordingly by an electrical drive.

On account of the omission of the mechanical connection between the steering wheel and the toothed rack, it is necessary for steer-by-wire steering systems to be particularly failsafe.

Therefore, what is needed is a steer-by-wire steering system which is particularly failsafe.

SUMMARY

According to the disclosure, by a steer-by-wire steering system for a vehicle, having a steering wheel, at least one sensor for capturing a steering angle of the steering wheel, a processing logic unit for determining a wheel setting angle requirement on the basis of the captured steering angle, and an actuator unit for setting a wheel setting angle at wheels of the vehicle according to the wheel setting angle requirement determined by processing logic unit, wherein the sensor is electrically connected directly to the vehicle electrical system and is supplied with electrical energy via the latter.

The fact that the sensor is directly supplied with electrical energy via the vehicle electrical system means that the sensor is supplied with power independently of further components of the steering system, which contributes to a high degree of failure safety of the steering system.

The processing logic unit comprises a function which makes it possible to determine the wheel steering angle requirement. In other words, the processing logic unit enables digital signal processing, of the signals received from the sensor.

The processing logic unit may, in principle, be present in any desired control unit of the steering system as long as it is configured to receive signals from the sensor and to forward them to the actuator unit.

In one exemplary arrangement, the at least one sensor is an angle sensor, for example, thus making it possible to directly determine an angular position of the steering wheel. However, it is also conceivable for the determination to be carried out in another manner in the case of other man-machine interfaces for capturing driver inputs, for example by a torque sensor or a force sensor.

According to one exemplary aspect, the steering system comprises a steering unit, having a steering actuator for applying a torque to the steering wheel, wherein the steering unit is configured to determine a steering angle of the steering wheel on the basis of a position of the steering actuator. The steering angle is therefore captured redundantly, by the sensor on the one hand and by the steering unit on the other hand. This additionally increases the failure safety of the steering system. In one exemplary arrangement, since the steering unit and the sensor are supplied with electrical energy independently of one another, it is still ensured that the steering angle is captured if the sensor or the steering unit fails.

The processing logic unit may be integrated in the steering unit and/or in the actuator unit. This means that the steering unit and/or the actuator unit has/have a corresponding control unit which is configured to capture and process the measured steering angle and to determine a corresponding wheel setting angle requirement.

In one exemplary arrangement, both the steering unit and the actuator unit have an accordingly configured control unit, with the result that the processing logic unit is also redundantly present.

However, only the actuator unit can cause the implementation of the wheel setting angle at the wheels. For this purpose, the actuator unit has, for example, a front axle actuator which can linearly displace a toothed rack.

The steering unit and the actuator unit are connected to one another via a communication line, for example and the at least one sensor is connected directly to the actuator unit via a signal line. The actuator unit can therefore receive information relating to a steering angle in two mutually independent ways, from the sensor on the one hand and from the steering unit on the other hand. If the sensor or the steering unit fails, it is consequently ensured that a steering signal is still processed and the wheel setting angle can be set accordingly.

The steering unit and the actuator unit are electrically connected directly to the vehicle electrical system and are supplied with electrical energy via the vehicle electrical system. This means that the at least one sensor, the steering unit and the actuator unit are completely independent of one another in terms of the supply with electrical energy. The supply with electrical energy is therefore particularly reliable.

According to one aspect, the steering system has a first processing path and a second processing path, wherein each processing path comprises its own processing logic unit, an actuator unit and at least one sensor for capturing the steering angle, and wherein the first processing path is a master path which, during normal operation, captures a steering angle and determines the wheel setting angle requirement ahead of the second processing path and sets the corresponding wheel setting angle. As a result of two processing paths being provided, each component is redundantly provided, thus additionally increasing the failure safety of the steering system. The processing logic unit in the first processing path is in particular identical to the processing logic unit in the second processing path.

In one exemplary arrangement, more than two processing paths are provided, for example three processing paths. The failure safety is increased further by each additional processing path.

The interconnection of the components in each processing path may be identical or different. In the case of a different interconnection, different failure scenarios may possibly be covered in both processing paths.

The actuator units of the first and second processing path may each be connected to one another in terms of signaling via communication lines. The processing paths can therefore communicate with one another and interchange information if necessary.

Each processing path may also have a steering unit, which steering units are likewise connected to one another in terms of signaling via communication lines.

In one exemplary arrangement, the power supplies for the processing paths are independent of one another. To be precise, two vehicle electrical systems which differ from one another are provided, wherein each processing path is supplied with electrical energy by a different vehicle electrical system. This ensures that the steering system operates reliably even if the power supply for a processing path fails.

The sensor of one of the two processing paths is, for example, electrically connected to the steering unit and is supplied with electrical energy via the latter. Consequently, the sensor is electrically connected directly to the vehicle electrical system in one of the two processing paths and to the steering unit in the other processing path. If the sensor is connected to the steering unit, it is possible to dispense with separate power conversion and power stabilization since this is already carried out in the steering unit. The complexity of the steering system can thus be reduced.

BRIEF DESCRIPTION OF DRAWINGS

Further advantages and features of the disclosure will become apparent from the following description and from the accompanying drawings, to which reference is made. In the drawings.

DETAILED DESCRIPTION

Figure 1:
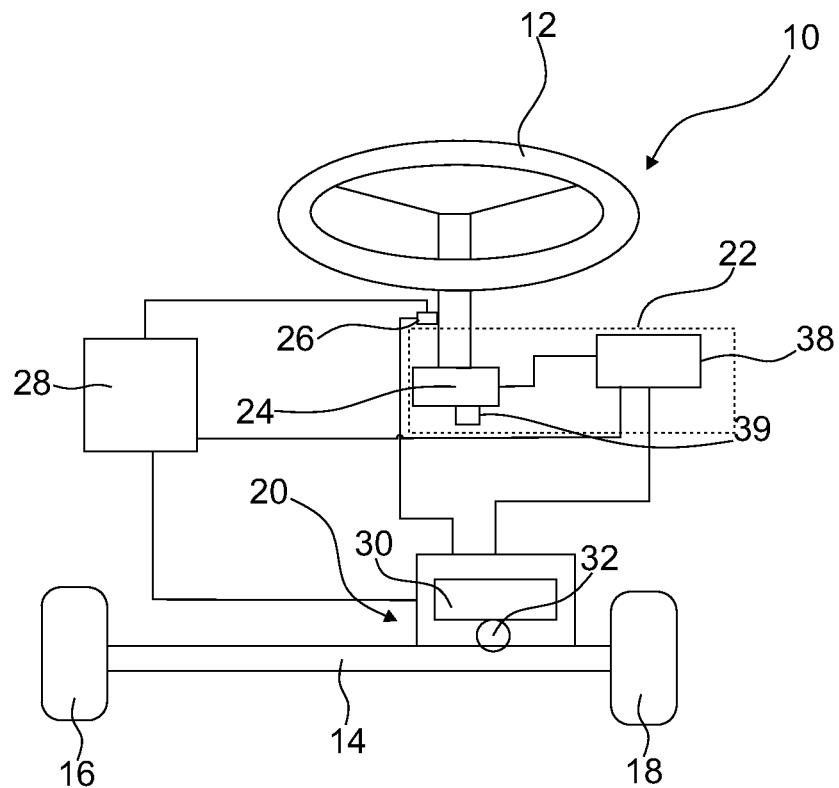
FIG. 1 schematically shows a steering system according to the disclosure.

FIG. 1 schematically illustrates a steer-by-wire steering system 10 for a vehicle, having a steering wheel 12.

The steering system 10 comprises a toothed rack 14. The toothed rack 14 is connected to a wheel carrier via track rods, which are not illustrated for the sake of simplicity, in such a manner that a linear displacement of the toothed rack 14 results in rotation of the wheel carriers about their steering axis.

The steering system 10 also comprises an actuator unit 20 for setting a wheel setting angle at the wheels 16, 18 of the vehicle on the basis of a steering angle of the steering wheel 12.

A steering unit 22 is also provided and is configured to apply a torque to the steering wheel 12. The steering unit 22 comprises a steering actuator 24 for this purpose.

A sensor 26, which in one exemplary arrangement, is an angle sensor, is configured to capture a steering angle of the steering wheel 12.

The steering system 10 also has a processing logic unit 28 which is configured to receive the steering angle captured by the sensor 26 and to determine a wheel setting angle requirement on the basis of the steering angle captured by the sensor 26, on the basis of which wheel setting angle requirement a wheel setting angle is set by the actuator unit 20 at the wheels 16, 18.

The processing logic unit 28 is configured to communicate with the sensor 26, the actuator unit 20 and also the steering unit 22 using signaling.

The processing logic unit 28 is schematically illustrated in FIG. 1. However, the processing logic unit 28 is not a physical unit, but rather a signal processing function.

The processing logic unit 28 may be integrated in the steering unit 22 or in the actuator unit 20 or a processing logic unit 28 may be integrated both in the steering unit 22 and in the actuator unit 20, as explained in yet more detail below.

In the exemplary arrangement illustrated, the actuator unit 20 comprises a servomotor 30 and a pinion 32 which acts on the toothed rack 14.

In an alternative exemplary arrangement, which is not illustrated for the sake of simplicity, the actuator unit 20 comprises electromotive control actuators instead of a toothed rack and a pinion 32, wherein a control actuator is assigned to each wheel 16, 18.

In the steer-by-wire steering system 10, there is no mechanical coupling between the steering wheel 12 and the wheels 16, 18. Instead, a wheel setting angle is set by the servomotor 30.

For this purpose, the pinion 32, which is in toothed engagement with the toothed rack 14, is rotated by the servomotor 30, as a result of which the toothed rack 14 is linearly moved.

Figure 2:
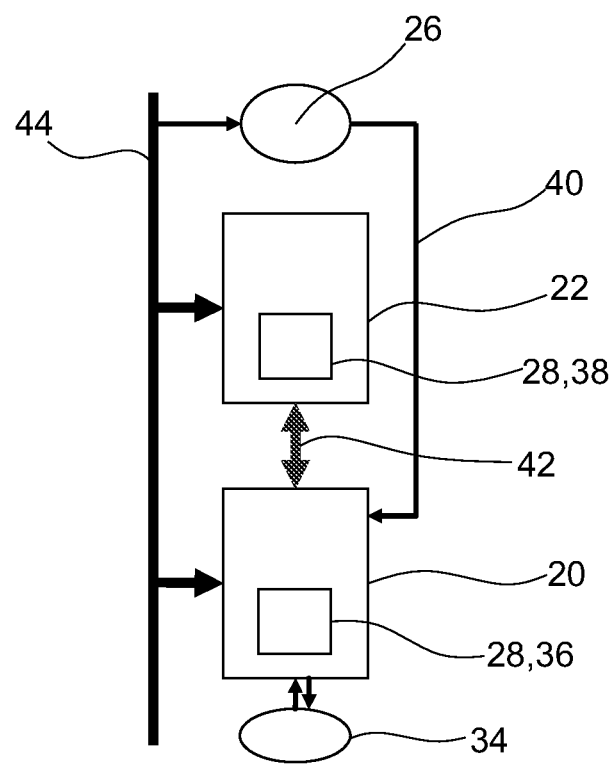
FIG. 2 schematically shows the electrical and electronic interconnection of the components of the steering system according to the disclosure, FIG. 3 schematically shows an electrical and electronic interconnection of a steering system according to the disclosure with two processing paths, FIG. 4 schematically shows an alternative electrical and electronic interconnection of a steering system according to the disclosure with two processing paths, and FIG. 5 schematically shows another alternative electrical and electronic interconnection of a steering system according to the disclosure with two processing paths.

FIG. 2 illustrates an electrical and electronic interconnection of the components of the steering system illustrated in FIG. 1, for example, the actuator unit 20, the steering unit 22 and the sensor 26.

FIG. 2 also illustrates a wheel setting sensor 34 which is configured to measure a wheel setting angle of the wheels 16, 18.

The actuator unit 20 can accordingly control the steering actuator 24 on the basis of a comparison of the wheel setting angle requirement with the wheel setting angle actually measured by the wheel setting sensor 34.

Both the actuator unit 20 and the steering unit 22 each have a control unit 36, 38.

The control unit 36 of the actuator unit 20 is configured, for example, to control the servomotor 30 to set a desired wheel setting angle.

In the exemplary arrangement according to FIG. 2, the processing logic unit 28 is integrated in the actuator unit 20, such as, for example, in the control unit 36.

In one exemplary arrangement, the control unit 36 is therefore configured to receive and process signals from the sensor 26 relating to the steering angle in order to determine a corresponding wheel setting angle requirement.

For this purpose, the sensor 36 is connected to the actuator unit 20 via a signal line 40.

The control unit 38 of the steering unit 22 is configured to apply a torque to the steering wheel 12 by controlling the steering actuator 24 (see FIG. 1).

In addition, the steering unit 22, more specifically, the control unit 38, is configured to determine a steering angle of the steering wheel 12 on the basis of a position of the steering actuator 24. For this purpose, the steering unit 22 may comprise a position sensor 39 (see FIG. 1) which can transmit a corresponding signal to the control unit 38.

If the sensor 26 fails, it is therefore still possible to determine a steering angle and to reliably and safely guide the vehicle.

In terms of capturing the steering angle, the steering unit 22 is thus used as a fallback solution for the sensor 26 or vice versa.

Position sensors are often designed such that they are reset to a value of zero when the vehicle is started. That is to say, if the vehicle was parked with the steering wheel turned, the position sensor 39 will not indicate the correct absolute steering angle, but rather only a change in the steering angle. In order to be able to nevertheless correctly determine an absolute steering angle by the position sensor 39, a difference between the steering angle of zero measured by the position sensor 39 and the steering angle measured by the sensor 26 is calculated when the vehicle is started. This difference is stored until the next time the vehicle is parked and is added to the value measured by the position sensor 39.

However, it is also conceivable for the steering angle to be able to be directly derived from the value measured by the position sensor 39.

The steering unit 22 and the actuator unit 20 are connected to one another in terms of signaling via a communication line 42, with the result that the steering angle determined by the control unit 38 can be transmitted to the actuator unit 20 or to the control unit 36 integrated in the actuator unit 20 and can be processed by the processing logic unit 28.

It is also conceivable for a processing logic unit 28 to likewise be integrated in the steering unit 22, more precisely in the control unit 38. That is to say, the processing logic unit 28 is redundantly provided in the actuator unit 20 and in the steering unit 22. In this case, a desired wheel setting angle can be transmitted directly to the actuator unit 20.

As far as the supply with electrical energy is concerned, not only the actuator unit 20 and the steering unit 22 but also the sensor 26 are electrically connected directly to a vehicle electrical system 44.

The vehicle electrical system 44 usually provides a voltage of 12 V.

Consequently, as far as the power supply is concerned, the stated components of the steering system 10 are independent of one another.

The steering system 10 according to FIG. 2 therefore still operates reliably if the sensor 26 fails or if the steering unit 22 partly or completely fails.

Figure 3:
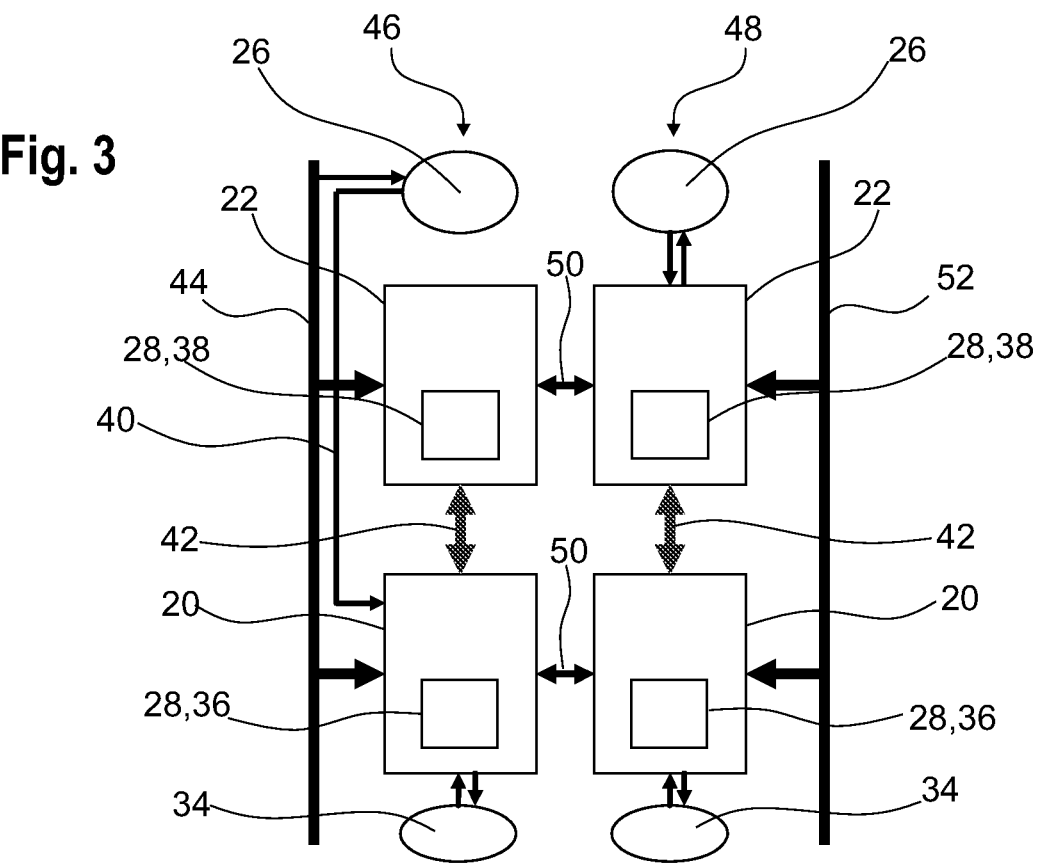

FIG. 3 illustrates an electrical and electronic interconnection of the components of the steering system 10 illustrated in FIG. 1 according to a further exemplary arrangement.

In this case, all components, for example, the actuator unit 20, the steering unit 22, the sensor 26 and the wheel setting sensor 34, are provided in duplicate.

In one exemplary arrangement, the steering system 10 according to FIG. 3 has a first processing path 46 and a second processing path 48, wherein each processing path comprises its own actuator unit 20, a steering unit 22, a processing logic unit 28 and at least one sensor 26 for capturing the steering angle.

The first processing path 46 is a master path which, during normal operation, captures a steering angle and determines the wheel setting angle ahead of the second processing path 48.

Normal operation is used to mean operation in which all components of the steering system 10 are operating correctly.

The electrical and electronic interconnection in the master path corresponds to the interconnection illustrated in FIG. 2.

In the second processing path 48, the interconnection of the sensor 26 differs, both in an electrical and in an electronic respect, from the interconnection of the sensor 26 in the first processing path 46.

Specifically, the sensor 26 is electrically connected to the steering unit 22 and is therefore supplied with electrical energy via the steering unit 22, rather than via the vehicle electrical system.

In terms of signaling as well, the sensor 26 in the second processing path 48 is connected to the steering unit 22. Information relating to the steering angle is consequently forwarded in the second processing path 48 to the actuator unit 20 via the steering unit 22.

The steering units 22 and the actuator units 20 of the two processing paths 46, 48 may likewise communicate with one another via communication lines 50.

The steering system is particularly failsafe by virtue of two parallel processing paths 46, 48 being provided.

For example, the power supplies for the processing paths 46, 48 are also independent of one another by virtue of the two processing paths 46, 48 being supplied with electrical energy by different vehicle electrical systems 44, 52.

For example, provision is made for the steering angle to be determined by the steering unit 22, that is to say by capturing the position of the steering actuator 24 by the position sensor 39, during normal operation.

The wheel setting angle requirement is then determined by the processing logic unit 28, that is to say either in the control unit 36 of the actuator unit 20 or in the control unit 38 of the steering unit 22.

The actuator units 20 then set a corresponding wheel setting angle of the wheels, which can be monitored by the wheel setting sensor 34.

A failure of the sensors 26 and of the steering unit 22 in the second processing path 48 has no consequence for the method of operation of the steering system 10.

If the position sensor 39 or the steering unit 22 as a whole in the first processing path 46 fails, there are various fallback options which ensure a reliable method of operation of the steering system 10.

On the one hand, the steering angle can be captured by the sensor 26 in the first processing path 46 and forwarded to the actuator unit 20. The wheel setting angle requirement can be determined in the control unit 36 of the actuator unit 20 and the wheels can be correspondingly turned by the actuator units 20. In an alternative exemplary arrangement, the capturing of the steering angle by the sensor 26 can be the variant implemented during normal operation. In this case, the position sensor 39 is correspondingly used as a fallback option.

Alternatively, the steering angle can, in a similar manner, be determined in the steering unit 22 of the second processing path 48, that is to say by capturing the position of the steering actuator 24, instead of in the steering unit 22 of the first processing path 46.

Further alternatively, the steering angle can be captured by the sensor 26 in the second processing path 48 and can be forwarded to the steering unit 22 for further processing.

This option is appropriate, in particular, when, for example, the position sensor 39 for capturing the position of the steering actuator 24 has failed, but the control unit 38 is still able to capture and at least forward the signal from the sensor 26.

In this case, the wheel setting angle requirement can be determined either in the control unit 38 of the steering unit 22 or, if the function of the latter is likewise impaired, in the control unit 36 of the actuator unit 20.

A particularly high degree of failure safety is achieved by the steering system 10 described in connection with FIG. 3.

For example, if the steering unit 22 in the first processing path 46 fails, at least two fallback options, which are completely independent of one another both in terms of the energy supply and in terms of the functional interconnection, remain. This means that a further partial failure does not result in the failure of all remaining fallback options.

Figure 4:
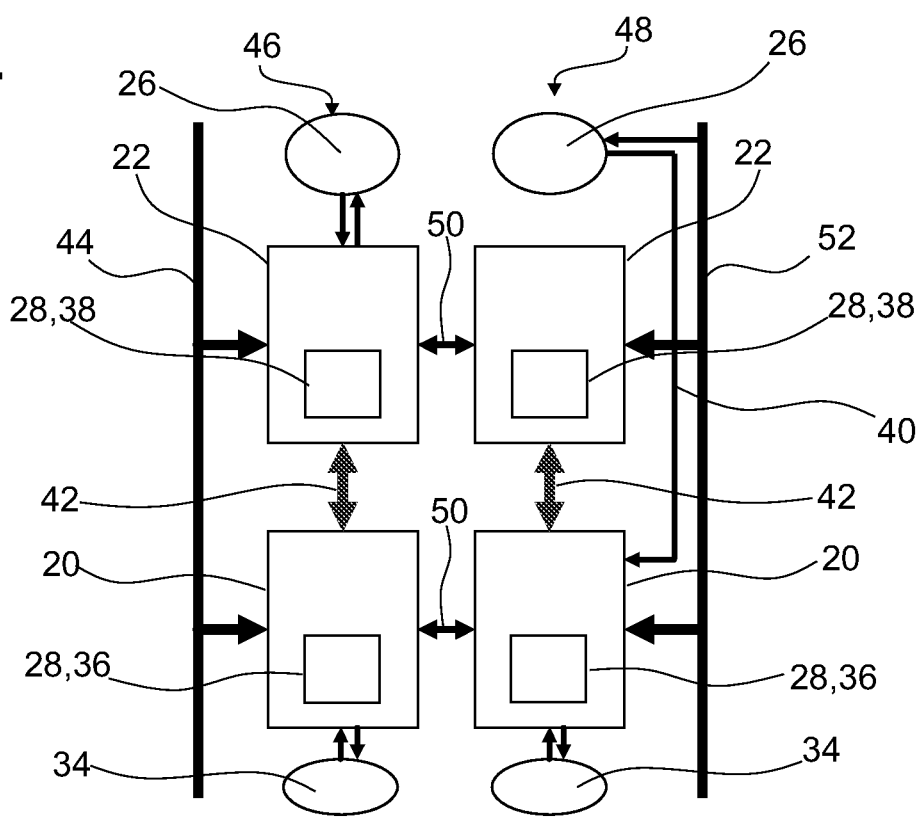

FIG. 4 illustrates a further electrical and electronic interconnection of the components of the steering system illustrated in FIG. 1.

The interconnection illustrated in FIG. 4 is virtually a mirror image of the interconnection illustrated in FIG. 3.

More precisely, the exemplary arrangement illustrated in FIG. 4 differs from the arrangement illustrated in FIG. 3 in terms of the interconnection of the sensors 26.

For example, the sensor 26 in the first processing path 46, which is the master path, is both electrically and electronically connected to the steering unit 22.

The sensor 26 in the second processing path 48 is however electrically connected directly to the vehicle electrical system 52 and connected in terms of signaling to the actuator unit 20.

If the steering unit 22 in the first processing path 46 fails in this case, the second processing path 48 is used as a fallback solution.

If there is only a partial failure of the steering unit 22 in the first processing path 46, during which the steering unit 22 can still receive and forward signals from the sensor 26, the sensor 26 in the first processing path may also be used as a fallback option.

Like in the exemplary arrangement described in FIG. 3, the sensor 26 in the first processing path 46 can also be used here to capture the steering angle during normal operation.

Figure 5:
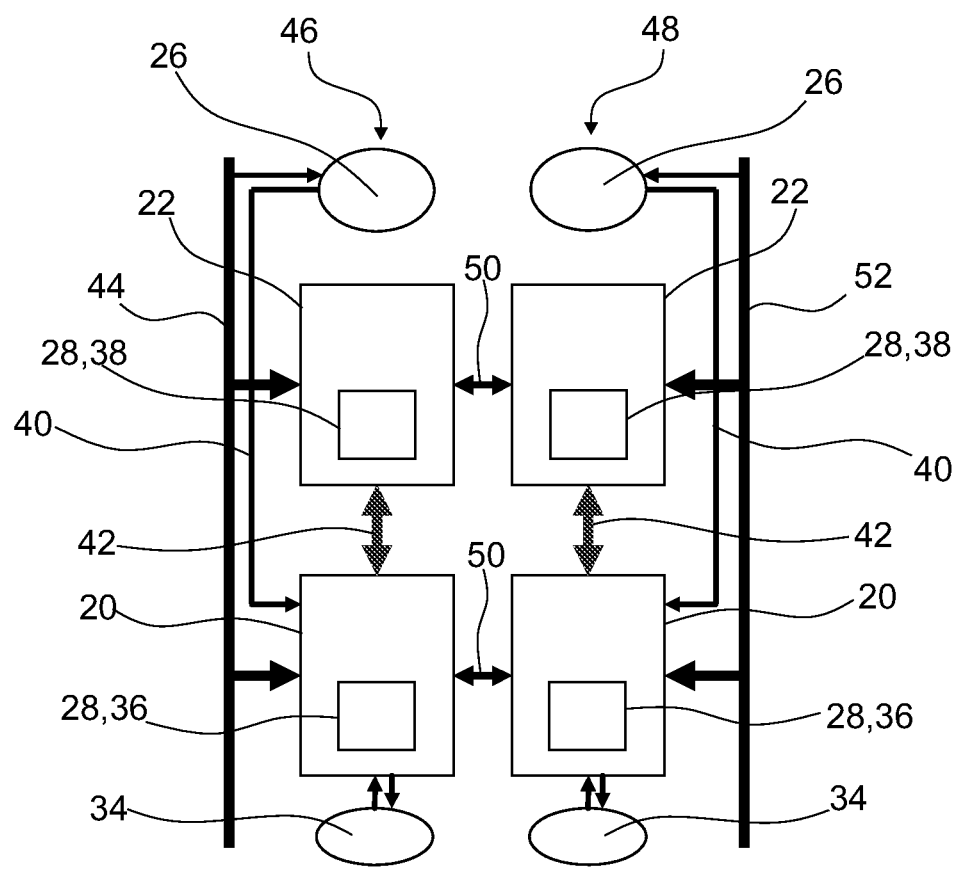

FIG. 5 illustrates a further electrical and electronic interconnection of the components of the steering system illustrated in FIG. 1.

In the exemplary arrangement illustrated in FIG. 5, the electrical and electronic interconnection is identical in both processing paths 46, 48.

More precisely, the sensors 26 of both processing paths 46, 48 are directly connected to the respective vehicle electrical system 44, 52.

Both sensors 26 are connected, via signal lines 40, to the respective actuator unit 20 in the corresponding processing path 46, 48.

The exemplary arrangement illustrated in FIG. 5 has a particularly high degree of failure safety since the sensors 26 in both processing paths 46, 48 are electrically independent.

The invention claimed is:

1. A steer-by-wire steering system for a vehicle, comprising a steering wheel, at least one sensor for capturing a steering angle of the steering wheel, a processing logic unit for determining a wheel setting angle requirement on the basis of the captured steering angle, an actuator unit for setting a wheel setting angle at wheels of the vehicle according to the wheel setting angle requirement determined by the processing logic unit, a steering unit comprising a steering actuator for applying a torque to the steering wheel, wherein the steering unit is configured to determine a steering angle of the steering wheel on the basis of a position of the steering actuator, wherein the steering unit provides redundant steering angle detection independent from the at least one sensor, wherein the at least one sensor is electrically connected directly to an vehicle electrical system and is supplied with electrical energy via the vehicle electrical system, wherein the processing logic unit is configured to determine a difference between a steering angle of zero measured by a position sensor and the steering angle measured by the at least one sensor when the vehicle is started, store the difference, and add the difference to subsequent values measured by the position sensor to determine an absolute steering angle.

2. The steer-by-wire steering system as claimed in claim 1, wherein the at least one sensor is an angle sensor.

3. The steer-by-wire steering system as claimed in claim 1, wherein the processing logic unit is integrated in the steering unit and/or in the actuator unit.

4. The steer-by-wire steering system as claimed in claim 1, wherein the steering unit and the actuator unit are connected to one another via a communication line and the at least one sensor is connected directly to the actuator unit via a signal line.

5. The steer-by-wire steering system as claimed in claim 1, wherein the steering unit and the actuator unit are electrically connected directly to the vehicle electrical system and are supplied with electrical energy via the vehicle electrical system.

6. The steer-by-wire steering system as claimed in claim 1, wherein the steering system has a first processing path and a second processing path, wherein each processing path comprises its own processing logic unit, an actuator unit and at least one sensor for capturing the steering angle, and wherein the first processing path is a master path which, during normal operation, captures a steering angle and determines the wheel setting angle requirement ahead of the second processing path.

7. The steer-by-wire steering system as claimed in claim 6, wherein the actuator units of the first and the second processing path are each connected to one another in terms of signaling via communication lines.

8. The steer-by-wire steering system as claimed in claim 6, wherein the power supplies for the processing paths are independent of one another.

9. The steer-by-wire steering system as claimed in claim 6, wherein the sensor of one of the two processing paths is electrically connected to a steering unit and is supplied with electrical energy via the steering unit.

* * * * *